June 26, 1951 P. A. NORRIS 2,558,662

REINFORCED PLASTIC ARTICLE

Filed March 15, 1946

INVENTOR
Paul A. Norris
BY
his ATTORNEYS

Patented June 26, 1951

2,558,662

UNITED STATES PATENT OFFICE 2,558,662

REINFORCED PLASTIC ARTICLE

Paul A. Norris, Dayton, Ohio, assignor to General Motors Corporation, Detroit, Mich., a corporation of Delaware Application March 15, 1946, Serial No. 654,779

1 Claim. (Cl. 154—46)

This invention relates to plastics and is particularly concerned with laminated plastics which have high impact resistance and are tough and flexible.

It is an object of the invention to provide a composition and method for making a laminated plastic article wherein the article has high impact strength, a reasonable degree of flexibility and a durable heat resistant and moisture resistant surface.

In carrying out the above object, it is a further object to provide a composition for and method of making large sheets of laminated plastic material, which has a low tendency toward shrinkage in the mold whereby satisfactory moldings can be made in relatively short curing periods.

A still further object of the invention is to provide a composition for and method of making a laminated plastic article with high resistance toward impact stress wherein the laminate, or cloth sheeting material, is sealed by a plastic wetting agent which, when dried, presents a very thin sealing coat over the laminate and which prevents ingress of another plastic that forms the main body of the laminated article, which later plastic has high strength and is of a semi-rigid character.

In carrying out the above object it is a further object to seal the cloth sheeting material with a carboxy or hydroxy methyl cellulose in water solution.

Further objects and advantages are apparent, reference being had to the accompanying drawing wherein a preferred object of the invention is clearly shown.

Figure 1:
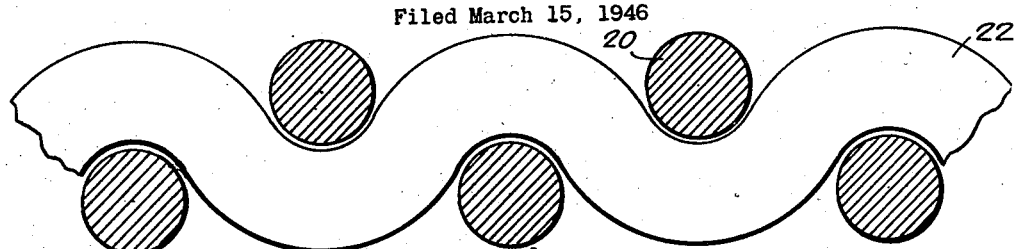
Fig. 1 is a cross section on a greatly enlarged scale of the cloth laminating material.

In the manufacture of large surface, relatively thin articles, such as door panels and the like, it has always been desirable to form such a panel of a material that has thermosetting properties but which may be poured into the mold in liquid form and cured in a relatively short time and wherein the panel may be removed hot from the mold with a satisfactory smooth surface thereon together with reasonable flexibility, toughness and great strength and resistance toward impact blows. Such material heretofore has been unknown since, when the molding is made, the basic resin, or plastic, used impregnates completely the cloth reenforcement or laminate which rigidly holds the cloth so that it is easily sheared by impact blows whereby the article is unsatisfactory for its intended use. Further, when the article is removed from the mold hot and/or when the article is cured in a relatively short time through the use of catalysts in the compound, great shrinkage occurs, which if the article is flanged and includes re-entrant angles thereon will cause breakdown of the panel if there is no relief for the shrinkage whereby the article becomes distorted and is usually cracked at the corner portion thereof, thereby making it unusable.

This invention is, in the main, directed to the solution of these past problems in a satisfactory manner whereby large sections of sheet material having flanged portions thereon may be manufactured with great ease and in an expeditious manner. These articles are substantially free from shrinkage cracks or distortion and may be removed from the mold while hot. Furthermore the articles may be cured in a relatively short time and while reasonably flexible and tough have high resistance toward impact blows and withal are commercially economical from a manufacturing standpoint.

In connection with door panels, I have found that the base material therefor is preferably an alkyd polyester reacted with vinyl benzene or any other easy polymerizable hydrocarbon, for example, vinyl benzene, di-vinyl benzene, combinations thereof etc. The alkyd polyesters may be formed as is well known in the art by the reaction of polybasic acids or anhydrides thereof with polyhydric alcohols, such as members of the glycol family. I have found that phthalic anhydride reacted with glycerol forms a satisfactory alkyd polyester which may be reacted with vinyl benzene in suitable proportions to obtain the desired plasticity and ultimate physical characteristics. In place of phthalic anhydride, phthalic acid, maleic acid, maleic anhydride, succinic acid, adipic acid, anhydrides thereof, or in fact any of the polybasic acids are satisfactory, together with any polyhydric alcohol such as, glycerol, ethylene glycol or any other glycol.

The reaction between the polybasic acid and polyhydric alcohol proceeds primarily as a condensation reaction. The second reaction between the alkyd polyester and the polymerizable hydrocarbon probably occurs with some cross linkage between the compounds.

During the cure, the resin probably sets up through polymerization and mechanical vulcanization and substantially loses its thermoplastic properties and becomes thermosetting in character. Mechanical vulcanization may be explained by an intermingling of the molecular fibers which cause mechanical cross bonding.

The reaction product of the alkyd polyester and the polymerizable compound forms a liquid vulcanizable alkyd resin which may be preserved by the addition of small quantities of guiacol, etc. that acts solely as an inhibitor against atmospheric setting up of the compound. Quantities in the order of 2% guiacol are usually satisfactory.

In practice I use equal proportions of the alkyd polyester and vinyl benzene to which is added approximately 20% by weight of a filler which may be a pigment per se or may contain a pigment, for example, 20% by weight of the plastic component of titanium dioxide may be used. In this instance 2% titanium dioxide yields a satisfactory color and the remaining 18% acts solely as a filler which reduces the shrinkage as noted hereinbefore. In place of titanium dioxide, the filler portion may be silica dioxide or any other inert material. In this connection the quantity thereof to be used should be equivalent in volume to the volume of titanium dioxide in the quantities noted. In certain instances the quantities of the filler may reach 50% by weight of the plastic ingredient (for $TiO_2$) but obviously in this case the strength of the article and its flexibility will be reduced. Therefore, for a door panel or other similar article I prefer to use in the order of 20% by weight. It is apparent that other materials yielding desired properties may be used as satisfactory substitutes.

In the manufacture of the panel, the laminate, or cloth sheeting used as a reenforcement is sealed prior to its introduction into the mold and this sealing may be accomplished in one embodiment by dipping the cloth in a water solution of a carboxy or hydroxy-methyl cellulose (10%, methyl cellulose derivative, 90% water). The laminate impregnated with the methyl cellulose derivative is then dried, whereby the major portion of the impregnant is evaporated since this portion is water. After drying it will be found that the methyl cellulose derivative impregnates each fiber of the cloth with a complete coating thereover of the external surfaces. This coating prevents introduction into the cloth of the alkyd resin to be applied in the mold. This sealing process performs two very important functions, first and most important, the hydroxy or carboxy methyl cellulose compound is tough and highly flexible and is a good wetting agent, and after impregnation into the cloth, the cloth is still flexible and is difficult to tear and obviously due to its flexibility has high resistance to impact blows. Thus, upon impregnation with the more rigid plastic, the sealed cloth fibers do not soak up any of the more rigid plastic whereby their resistance toward impact is not in any way reduced. In this instance if the fibers soaked up the more rigid plastic material they would easily be sheared upon impact blows.

The second factor in favor of the use of sealing compound revolves around the economy of the operation. The plastic utilized in the main body of the article is a relatively expensive compound compared to the methyl cellulose derivative and since 90% of the sealing solution is water, very little sealing compound is utilized. Thus when the fiber is impregnated and sealed it does not tend to soak up the more expensive plastic and thereby reduces the cost of the finished article, while producing a reasonably flexible, tough and strong article.

In the manufacture of articles from the material described herein, the mold is filled with a catalyzed charge of the vulcanizable alkyd resin. On this is laid a sealed section of cloth material. The mold is closed and the plastic is vulcanized or cured for from one to five minutes at 220° F. The time and temperature may be varied to fulfill manufacturing necessities, although the time and temperature noted is preferred. After curing, the mold is opened and the plastic article may be removed hot therefrom.

In order to catalyze the already inhibited plastic, two parts of a cobalt soap, such as cobalt napthanate or cobalt resinate, for example, is used together with 1.5 parts by weight of a peroxide such as benzoyl peroxide. These two compounds counteract the guiacol inhibitor previously added and will cause a setting up of the compound in the presence of air if sufficient time is given. I have found that from .1 part to 4 parts of the catalyst by weight may be used with varying curing times and temperatures.

The use of the filler as previously explained prevents or reduces shrinkage of the plastic upon curing and the use of the sealing compound improves the physical characteristics of the finished article. These factors are the principal reasons for the success of this invention whereby satisfactory panels and other large surface articles may be manufactured which have the desired physical characteristics.

In some cases it may be desirable to waterproof the laminate which may be accomplished by insolubilizing the methyl cellulose derivative. This may be done by adding glyoxal dialdehyde in small quantities, preferably less than 1%, depending upon the results desired.

It is apparent that the sealing method disclosed herein may be practiced with other sealing plastics and other molding plastics instead of those described. For example, for a sealing coat, polymerized butyral latex, flexible water soluble alkyd resins, or other liquid compounds of high flexibility are suitable. For the main body portion of the material in place of an alkyd resin, any other well known resin may be used and if thermosetting properties are not desired, thermoplastics may be used. For example, polyvinyl chloride, methyl methacrylate, phenolic resins, urea resins, etc.

Figure 2:
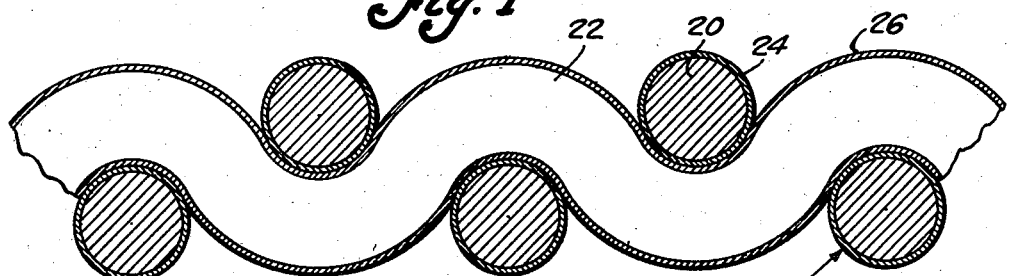
Fig. 2 is a similar view wherein the cloth has been sealed with the sealing coat described in detail hereinafter.
Figure 3:
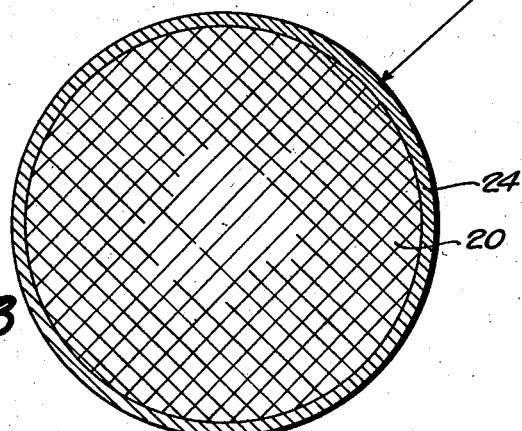
Fig. 3 is a cross section of one strand of the cloth in Fig. 2, on an even larger scale, showing the penetration of the sealing material wherein the concentration thereof is reduced toward the center of each strand, but is sufficient to form a complete coating of the outer surface of the strand.
Figure 4:
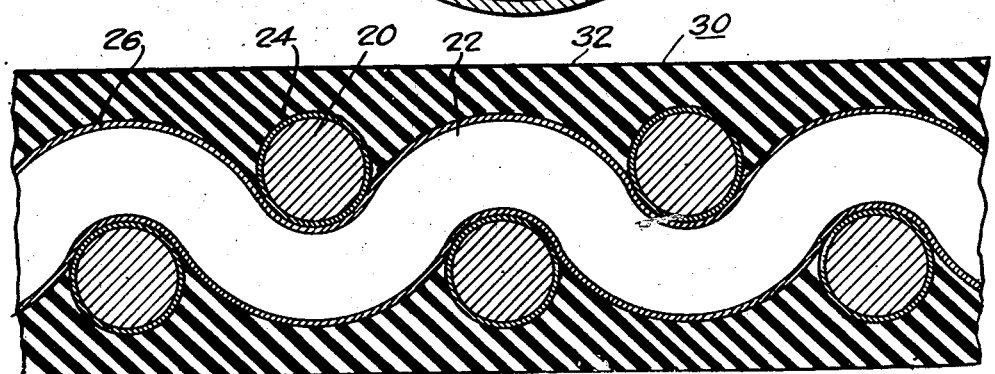
Fig. 4 is a view in cross section on a greatly enlarged scale and shows a sectional view of the laminated plastic article wherein the sealed cloth laminate is embedded in the plastic.

The drawing shows cross sections of the various material wherein Fig. 1 is a cross section of the laminate where the warp and woof are designated by numerals 20 and 22 respectively. It Fig. 2 the sealing compound is shown covering the threads 20 and 22 as at 24 and 26 respectively. This sealing compound, as noted, impregnates and completely coats each fiber as shown in an enlarged cross section of single thread or fiber in Fig. 3. A finished article 30 is shown in a fragmentary sectional view in Fig. 4 where the reinforced resin is designated at 32. This resin makes up the body of the article which is reinforced by the fabric designated at 20 and 22, which fabric is coated with the sealing compound 24.

While the embodiments of the present invention constitute preferred forms, it is to be understood that other forms might be adopted, all coming within the scope of the claim which follows.

What is claimed is as follows:

A new article of manufacture, comprising a reinforced plastic sheet which is semi-rigid and strong at room temperature, said plastic sheet consisting of a laminate of cloth which, prior to its incorporation in the sheet, has been sealed with hydroxy methyl cellulose which coats the cloth and is impregnated therein, and a resin impregnated into and completely covering said sealed laminate, said resin consisting of the reaction product of an alkyd poly-ester and vinyl benzene, said sheet having high impact resistance and reasonable flexibility.

PAUL A. NORRIS.

REFERENCES CITED

The following references are of record in the file of this patent:

UNITED STATES PATENTS

| Number | Name | Date |
|---|---|---|
| 2,009,139 | Redman | July 23, 1935 |
| 2,195,362 | Ellis | Mar. 26, 1940 |
| 2,234,252 | Homan | Mar. 11, 1941 |
| 2,285,490 | Broderick | June 9, 1942 |
| 2,329,741 | Broderick | Sept. 21, 1943 |
| 2,348,677 | Freeman | May 9, 1944 |